United States Patent
Kanehiro

(10) Patent No.: US 8,208,034 B2
(45) Date of Patent: Jun. 26, 2012

(54) IMAGING APPARATUS

(75) Inventor: Makoto Kanehiro, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 626 days.

(21) Appl. No.: 12/403,982

(22) Filed: Mar. 13, 2009

(65) Prior Publication Data
US 2009/0231445 A1 Sep. 17, 2009

(30) Foreign Application Priority Data
Mar. 17, 2008 (JP) ................................ 2008-066910

(51) Int. Cl.
H04N 5/228 (2006.01)
H04N 5/235 (2006.01)

(52) U.S. Cl. ............... 348/222.1; 348/229.1; 348/208.1; 348/208.2; 348/208.6

(58) Field of Classification Search ............... 348/222.1, 348/229.1, 208.1–208.6
See application file for complete search history.

(56) References Cited

U.S. PATENT DOCUMENTS

| | | | | |
|---|---|---|---|---|
| 5,517,242 | A * | 5/1996 | Yamada et al. | 348/254 |
| 5,982,373 | A * | 11/1999 | Inman et al. | 345/419 |
| 6,784,935 | B1 * | 8/2004 | Uya et al. | 348/311 |
| 7,187,407 | B2 | 3/2007 | Kanehiro et al. | |
| 7,990,433 | B2 * | 8/2011 | Yamashita | 348/229.1 |
| 8,000,509 | B2 * | 8/2011 | Zhu et al. | 382/128 |
| 8,081,208 | B2 * | 12/2011 | Inomata et al. | 348/80 |
| 2002/0021361 | A1 | 2/2002 | Kitajima et al. | |
| 2003/0095189 | A1 * | 5/2003 | Liu et al. | 348/208.4 |
| 2003/0098919 | A1 * | 5/2003 | Liu et al. | 348/297 |
| 2004/0005697 | A1 | 1/2004 | Mahant et al. | |
| 2004/0056974 | A1 | 3/2004 | Kitajima et al. | |
| 2004/0136603 | A1 * | 7/2004 | Vitsnudel et al. | 382/254 |
| 2004/0189818 | A1 * | 9/2004 | Tsuruoka et al. | 348/221.1 |
| 2005/0068426 | A1 * | 3/2005 | Kawasaki et al. | 348/222.1 |
| 2006/0066750 | A1 * | 3/2006 | Henderson et al. | 348/362 |
| 2006/0170780 | A1 * | 8/2006 | Turley et al. | 348/208.1 |
| 2007/0147820 | A1 * | 6/2007 | Steinberg et al. | 396/155 |
| 2007/0212045 | A1 * | 9/2007 | Yamasaki | 396/55 |
| 2009/0015921 | A1 * | 1/2009 | Yoon et al. | 359/554 |
| 2009/0244301 | A1 * | 10/2009 | Border et al. | 348/208.99 |
| 2011/0157383 | A1 * | 6/2011 | Jang | 348/208.6 |
| 2011/0157442 | A1 * | 6/2011 | Itakura et al. | 348/302 |

FOREIGN PATENT DOCUMENTS

| | | | |
|---|---|---|---|
| JP | 3674420 | | 5/2005 |
| JP | 3788714 | | 4/2006 |
| JP | 2008-004085 | * | 5/2007 |
| JP | 2007-202098 | * | 8/2007 |

* cited by examiner

*Primary Examiner* — Lin Ye
*Assistant Examiner* — Chia-Wei A Chen
(74) *Attorney, Agent, or Firm* — Dickstein Shapiro LLP

(57) ABSTRACT

An imaging apparatus, includes: an imaging optical system; an image pickup device; and a control device which is configured to control the image pickup device, wherein the control device is configured to preliminarily decide an exposure order of a relatively short time exposure in a prescribed image size; an exposure with almost the same exposure time as the relatively short time in a smaller image size than the prescribed image size, and a relatively long time exposure in the prescribed image size, and to perform an imaging operation once by exposing the image pickup device by the decided exposure order.

10 Claims, 4 Drawing Sheets

IMAGING APPARATUS

CROSS-REFERENCE TO THE RELATED APPLICATION

The entire contents of Japanese patent application No. JP 2008-066910 filed on Mar. 17, 2008, of which the convention priority is claimed in this application, are incorporated hereinto by reference.

BACKGROUND OF THE INVENTION

1. Field of the Invention

The present invention relates to an imaging apparatus which is capable of forming an image with improved dynamic range.

2. Description of the Related Art

Conventionally, JP-3674420 B discloses an imaging apparatus which is capable of improving a dynamic range.

The imaging apparatus disclosed by JP-3674420 B outputs a plurality of image signals with different exposure amounts, at least one of the image signals is set as an image signal with few numbers of pixels, the image signals are synthesized, and the dynamic range is improved.

Moreover, JP-3788714 B discloses an imaging apparatus which includes an image blur detecting device configured to detect the amount of image blur of a specified main part of a subject imaged and the amount of image blur other than it, and based on the amount of image blur detected by the image blur detecting device, availability of synthesis of image signals is determined. If it is determined that synthesis is impossible, the amount of partial image blur between a plurality of image information is detected, and synthetic image information is built with the plurality of image information at a part where the amount of image blur is equal to or less than a prescribed value, and synthetic image information is built with information of one image at a part where the amount of image blur is more than the prescribed value.

However, in the imaging apparatus disclosed by JP-3674420 B, if there is displacement between the plurality of images, an appropriate synthetic image can not be obtained.

In addition, in the imaging apparatus disclosed by JP-3788714 B, due to the amount of image blur of the main subject and the other amount of image blur being detected by the image blur detecting device, and synthetic image information being built with the plurality of image information at the part where the amount of image blur is equal to or less than the prescribed value, and synthetic image information being built with information of one image at the part where the amount of image blur is more than the prescribed value, problems arise such as arithmetic processing being enormous, processing time being long, and the apparatus being impractical.

SUMMARY OF THE INVENTION

At least an object of the present invention is to provide, for example, an imaging apparatus in which when synthesizing a plurality of image data, the influence of displacement is decreased utmostly, and the processing time of synthesis processing is reduced, and an image a with wide dynamic range is obtained.

In light of the above-mentioned, the present invention proposes, for example, an imaging apparatus including: an imaging optical system; an image pickup device; and a control device which is configured to control the image pickup device, wherein the control device is configured to preliminarily decide an exposure order of a relatively short time exposure in a prescribed image size; an exposure with almost the same exposure time as the relatively short time in a smaller image size than the prescribed image size, and a relatively long time exposure in the prescribed image size, to perform an imaging operation once by exposing the image pickup device by the decided exposure order.

In addition, the present invention proposes, for example, an imaging apparatus including: a main body which includes an imaging optical system and an image pickup device; a shake detecting device which is configured to detect a shake applied to the main body; a hand shake compensation device which is configured to move the image pickup device and perform a hand shake compensation based on the shake detected by the shake detecting device; a storing device which is configured to store image data of a subject imaged by the image pickup device; an image processing device which is configured to perform an image processing on the image data stored in the storing device; and a control device which is configured to control the image pickup device and the image processing device, wherein the control device preliminarily decides an exposure order of a relatively short time exposure in a prescribed image size; an exposure with almost the same exposure time as the relatively short exposure time in a smaller image size than the prescribed image size, and a relatively long time exposure in the prescribed image size, to perform an imaging operation once by exposing the image pickup device in the decided exposure order, the storing device stores the three kinds exposure image data individually, the control device selects long time exposure image data obtained by the relatively long time exposure, and either one kind of the two kinds of image data obtained by the relatively short time exposure, based on the image data stored in the storing device, the image processing device synthesizes the long time exposure image data and the selected one kind of image data, to form one subject image.

BRIEF DESCRIPTION OF THE DRAWINGS

The invention will be described further below with reference to exemplary embodiments and the accompanying schematic drawings, in which.

DETAILED DESCRIPTION OF THE PREFERRED EMBODIMENTS

Hereafter, embodiments of a digital still camera which is provided with an imaging apparatus according to the present invention will be explained with reference to the figures.

First Embodiment

Figure 1:
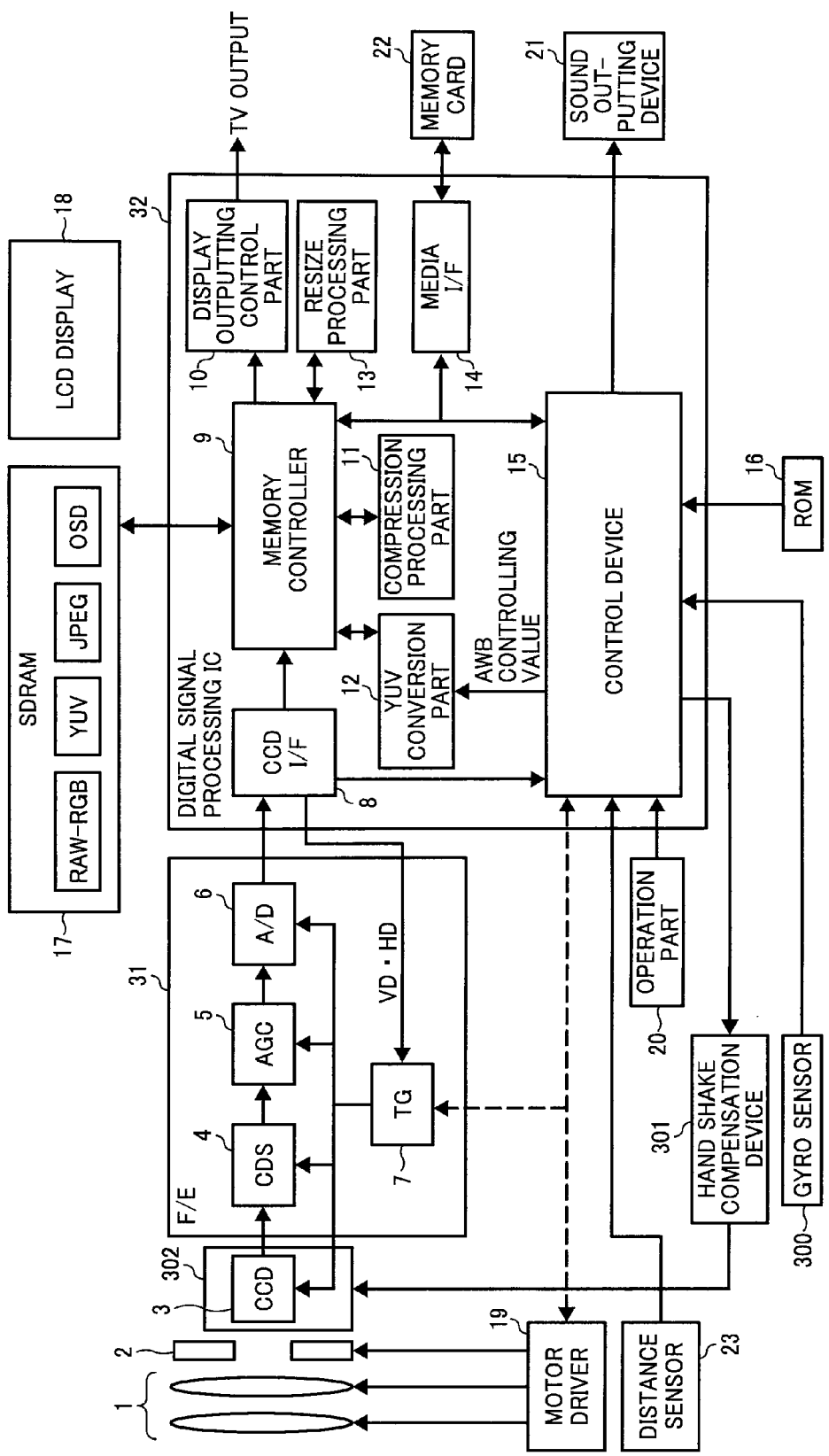
FIG. 1 is a block circuit diagram illustrating a schematic system structure of an imaging apparatus inside a digital still camera according to an embodiment of the present invention.
Figure 2:
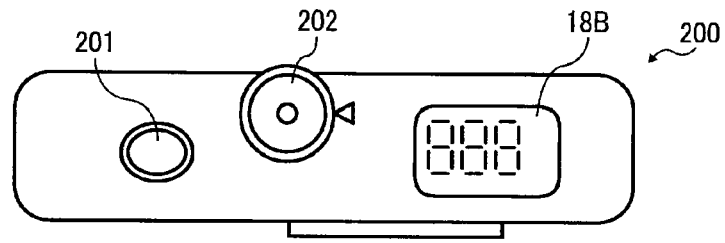
FIG. 2 is a top view illustrating an outline of a digital still camera according to another embodiment of the present invention.
Figure 3:
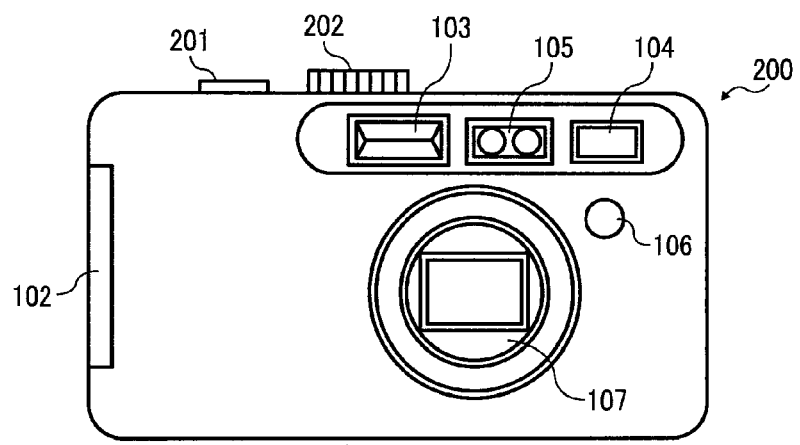
FIG. 3 is a front view of the digital still camera illustrated in FIG. 2 according to the other embodiment of the present invention.
Figure 4:
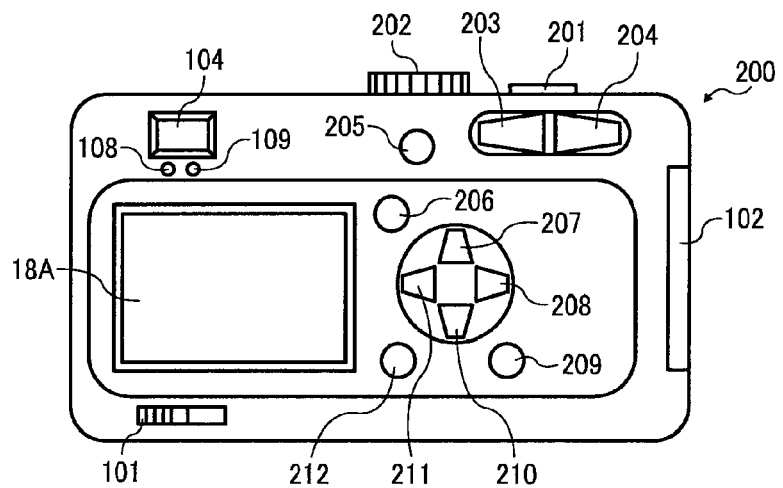
FIG. 4 is a back view of the digital still camera illustrated in FIG. 2 according to the other embodiment of the present invention.

FIGS. 1, 2, 3 and 4 are views, each of which illustrates a structure of a digital still camera according to an embodiment of the present invention, FIG. 1 is a block diagram illustrating a schematic view of a whole system structure of the digital still camera. FIGS. 2-4 are views, each of which schematically illustrates an outline of the camera illustrated in FIG. 1, where FIG. 2 illustrates a plan view, FIG. 3 illustrates a front view, and FIG. 4 illustrates a back view, respectively. The digital still camera illustrated in FIG. 1 includes: a photographing lens system (a photographing optical system) 1 having a focus lens (a focus optical system); a CCD3 (an image pickup device) which is configured to capture an image projected through the photographing lens system 1; a mechanical shutter 2 which is arranged between the photographing lens system 1 and the CCD3; a motor driver 19 which is configured to displace at least a focus lens of the photographing lens system 1 along an optical axis thereof in a range of movement; an operation part 20 having a shutter release button (a starting photographing operation inputting device) which is pressed to start photographing; a front-end (F/E) signal processing part 31 which is configured to perform a processing of a signal read from the CCD3 mainly; a gyro sensor 300 which is configured to detect shake of a camera body (main body) 200 (refer to FIG. 2 to FIG. 4); a hand shake compensation device 301 which is configured to compensate hand shake which is the shake of the camera body 200; and a digital signal processing IC32 (a control part) which is configured to perform a control for reading a signal from the CCD3, a processing of the read signal, a driving control of the motor driver 19, an input processing of an operation signal from the operation part 20, and various arithmetic processings such as an autofocus evaluated value which is an index value representing a focusing degree of an image represented by image data, based on the image data read from the CCD3, or the like.

A CCD stage 302 is provided movably in an X-Y direction in the camera body 200, and the CCD 3 is mounted on the CCD stage 302. The CCD stage 302 is moved by a driving mechanism (not illustrated) in the X-Y direction, and the driving mechanism is controlled by a control device 15 which includes such as a CPU and controls for example a displacement detecting device and an image processing device, based on a shake amount detected by the gyro sensor 300.

Here, the F/E signal processing part 31 includes a CDS (correlated double sampling) circuit 4, an AGC (automatic gain control) circuit 5, an A/D (analog/digital) converter 6, and a timing generator (TG) 7.

The digital signal processing IC 32 includes a CCD interface (CCD T/F) 8; a memory controller 9; a display outputting control part 10; a compression processing part 11; a YUV conversion part 12; a resize processing part 13; a media interface (media I/F) 14; and a control device 15. The digital signal processing IC 32 is configured to control a ROM (read only memory) 16, a frame memory (SDRAM: a memory device) 17, a liquid crystal display (LCD) 18, a sound outputting device 21, and a memory card 22, which are connected thereto, and to receive inputting of such as signals from a distance sensor 23, an operation part 20 and a ROM 16.

Moreover, the control device 15 works as an evaluated value calculating device to calculate an autofocus evaluated value L which is the above-mentioned index value, and the calculation of the autofocus evaluated value L is started when a power supply of the camera is switched on, and is performed per prescribed timing.

And, the control device 15 compares the calculated autofocus evaluated value L with a prescribed threshold set preliminarily, and decides which end of two ends of the range of movement to move the focus lens of the photographing lens system 1 to, based on the comparison result at a time of starting the photographing operation.

That is to say, pressing of the shutter release button of the operation part 20 starts the photographing operation, the control device 15 performs such a control that: detects that the release button is pressed, i.e. an operation of starting photographing is inputted, and controls the motor driver 19 to move the focus lens to either one end of the range of movement and to displace the focus lens gradually from the one end toward the other end, and at each displacement (per prescribed timing) calculates an autofocus evaluated value and compares the calculated autofocus evaluated value with the threshold value, and searches a displace position of the focus lens when an optimum focusing state of an image is obtained (a focus position), and moves the focus lens to the position obtained by the searching, which is called a contrast evaluation method AF control.

Moreover, the mechanical shutter 2 is inserted to an optical path between the photographing lens system 1 and the CCD 3, and opens and shuts the optical path and controls an exposure of the CCD 3. The CCD 3 converts an optical image entered into a receiving face at an exposure state to an electrical signal and holds it temporarily, and transfers and outputs the signal as image data.

The CDS circuit 4 performs a correlated double sampling of an output image signal from the CCD 3. A correlated double sampling output of the CDS circuit 4 is automatically gain controlled and regulated to a signal level for use by the AGC circuit 5. The A/D converter 6 converts an analog output of the AGC circuit 5 to digital data.

The timing generator (TG) 7 works corresponding to a VD signal (a vertical synchronization drive signal) and a HD signal (a horizontal synchronization drive signal) which are synchronization signals given from the CCD interface 8 of the digital signal processing IC 32, and supplies timing signals to each of the CCD 3, the CDS circuit 4, the AGC circuit 5 and the A/D converter 6 in cooperation with the control device 15, to synchronize the devices properly.

The digital signal processing IC 32 stores digital image data given through the A/D converter 6 of the signal processing part 31 in the frame memory 17, performs a required signal processing such as a compression processing and YUV conversion processing, and performs processings such as, storing data processed in the digital signal processing IC 32 to the frame memory 17, displaying image data given from the A/D converter 6 or read out from the frame memory 17 on the LCD display 18, compression processing and YUV processing and resize processing of the digital image data given from the A/D converter 6 or read out from the frame memory 17, and storing the digital image data read out from the frame memory 17 to the memory card 22 through the media interface 14 or the like, based on a control of the control device 15.

The CCD interface 8 receives the digital image data given from the A/D converter 6 of the signal processing part 31, and stores the data in the frame memory 17 through the memory controller 9.

The memory controller 9 is configured to control writing to and reading out from the frame memory 17, of such as RGB raw data (RAW-RGB) given through the CCD interface 8, YUV data which is YUV converted by the YUV conversion part 12, JPEG data which is compressed for example by the JPEG method (Joint Photographic Experts Group) by the compression processing part 11, and OSD (on screen display) image data to the frame memory 17, based on a control of the control device 15.

The display outputting control part 10 displays the image data read out from the frame memory 17 on the LCD display 18, and outputs TV output for displaying on an external television (TV) or the like.

The compression processing part 11 compresses the image data or the like given from the A/D converter 6 or read out from the frame memory 17 by a prescribed compression method such as the JPEG method.

The YUV conversion part 12 performs the YUV conversion of the image data given from the A/D converter 6 or read out from the frame memory 17, in accordance with an auto white balance (AWB) controlling value given from the control device 15.

The resize processing part 13 resizes the image data given from the A/D converter 6 or read out from the frame memory 17.

The media interface 14 writes the image data given from the A/D converter 6 or read out from the frame memory 17 to the memory card 22, in accordance with a control of the memory controller 9 and the control device 15.

That is to say, the memory controller 9 stores the image data given from the A/D converter 6 to the frame memory 17, and takes the image data out from the frame memory 17, and displays the image data on the LCD display 8 through the display outputting control part 10, and performs such controls of reading out the image data from the frame memory 17, compression processing by the JPEG method or the like by the compressing part 11, YUV conversion by the YUV conversion part 12, resizing processing by the resizing process part 13, and writing of data after the processings of compression, the YUV conversion, and the resizing to the frame memory 17, and in addition, writing of the data read out from the frame memory 17 to the memory card 22.

Operation programs of the control device 15 and data are recorded in the ROM 16, and the control device 15 performs various processings of photographing operations and processings of the above-mentioned autofocus control, based on the programs and data read out from the ROM 16.

The frame memory 17 is a semiconductor memory such as a SDRAM (Synchronous Dynamic Random Access Memory), and stores the RGB raw data, the YUV data which has been YUV converted, the JPEG data which has been JPEG compressed, and the OSD image data, individually.

An imaging apparatus includes the CCD 3, the F/E signal processing part 31, the digital signal processing IC 32, the frame memory 17, the CCD stage 302, the gyro sensor 300 and the hand shake compensation device 301 or the like.

The LCD display 18 is a display apparatus which is capable of displaying an image, such as a liquid crystal display apparatus, and displays the image data provided from the A/D converter 6 or taken out from the frame memory 17, or given through the display outputting control part 10, and further displays necessary information.

The motor driver 19 drives a lens driving motor of the photographing lens system 1 for focusing and zooming or the like, and drives a shutter driving motor (not illustrated) of the mechanical shutter 2, in conjunction with the timing generator 7 for opening and shutting the shutter, based on a control of the control device 15.

The operation part 20 includes at least a part of operation devices, such as a mode switch used to switch various modes and other switches, a key, a lever and a dial, excepting the shutter release button, and performs operations for providing information such as an operating indication, a setting indication and a selecting indication to the digital still camera, to the control device 15.

The sound outputting device 21 generates sound of such as an alarm or an audio announcement. The memory card 22 is a small-scale IC memory recording medium called a small card which contains a semiconductor non-volatile memory such as a flash memory, and is used as an external recording medium which is detachable from the digital still camera, and generally, for example, is inserted in a slot provided in the digital still camera.

For example, the memory card 22 takes out the image data in the frame memory 17 which has been compressed with such as the JPEG method, through the memory controller 9, from the frame memory 17, and records it as a result of photographing.

The distance sensor 23 constitutes a distance measurement device which measures a subject distance periodically with the distance measurement unit 105 illustrated in FIG. 3 by a method, namely a triangulation method.

The control device 15 monitors changes of a measurement value of the subject distance measured by the distance sensor 23, and determines whether a focusing state is kept or not. Moreover, the control device 15 performs such controls that read out the image data recorded in the frame memory 17 through the memory controller 9, and synthesize the read out image data, and record the synthesized image data to the frame memory 17 through the memory controller 9.

In addition, in FIGS. 2-4, a LCD monitor 18A is provided at a back surface of the body of the digital still camera, a sub LCD 18B is provided at an upper surface of the body, and the LCD monitor 18A and the sub LCD 18B constitute the LCD display 18 illustrated in FIG. 1.

The LCD monitor 18A mainly displays an images the sub LCD 18B mainly displays various symbol marks or the like which indicate such as a film counter, a date/time and an operation state.

And, at the upper surface of the camera body 200, a shutter release button 201 and a mode dial 202 are provided, at the back surface of the body a wide-angle side (WIDE) zoom switch 203, a telephoto side (TELE) zoom switch 204, a self timer/cancel switch 205, a menu switch 206, an up/strobe switch 207, a right switch 208, a display switch 209, a down/micro switch 210, a left/image confirmation switch 211 and an OK switch 212 are provided. These switches constitute the operation part 20 in FIG. 1.

At a lower part of the back surface of the camera body 200, a power switch 101 is provided, and at a right side surface (towards the subject) of the camera body 200, a memory card/battery cover 102 which covers a storage part of a battery as the power source and the memory card 22 such as a SD card is provided.

A strobe light-emitting part 103, an object plane of an optical viewfinder 104, a distance measuring unit 105, a remote control light-receiving part 106 and a lens barrel unit 107 of the photographing lens are provided.

At the back surface of the camera body 200, an eye piece part of the optical viewfinder 104, an AF display LED (Light Emitting Diode) 108 and a strobe display LED 109 are further provided.

Operation

Next, operations of a digital still camera with the above-mentioned structure will be explained.

When the shutter release button 201 illustrated in FIG. 2 is operated, an auto focus operation for detecting a focusing position and a still image recording process are performed.

The auto focus operation is performed such that when the shutter release button 201 is pressed, a signal indicating a start of the photographing operation of a still image is loaded to the control device 15 from the operation part 20, and the control device 15 drives the focus lens which is at least a part of the photographing lens system 1 through the motor driver 19, in synchronism with a frame rate, and for example a contrast evaluation (so-called mountain-climbing system) AF control method is performed.

Figure 5:
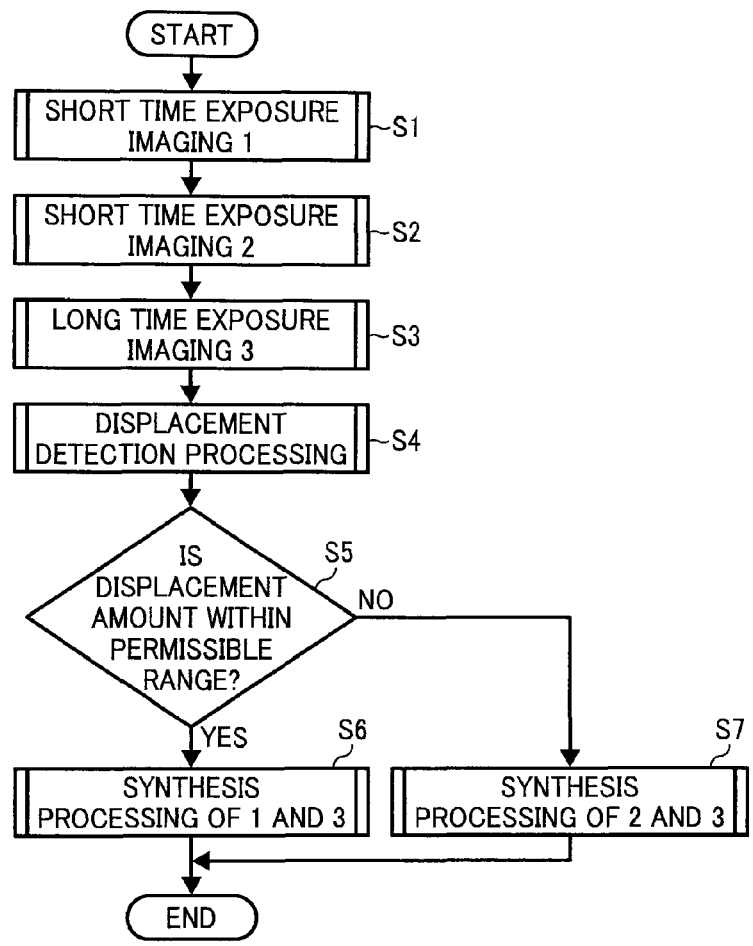
FIG. 5 is a flow chart illustrating a processing operation of the digital still camera according to a first embodiment of the present invention.

The still image recording process is performed according to an operation processing of a flow chart illustrated in FIG. 5 after the auto focus operation. During the still image recording process, a hand shake compensation processing is performed based on an output signal of the gyro sensor 300, and the hand shake compensation of the camera body 200 is performed through the hand shake compensation device 301.

Figure 6:
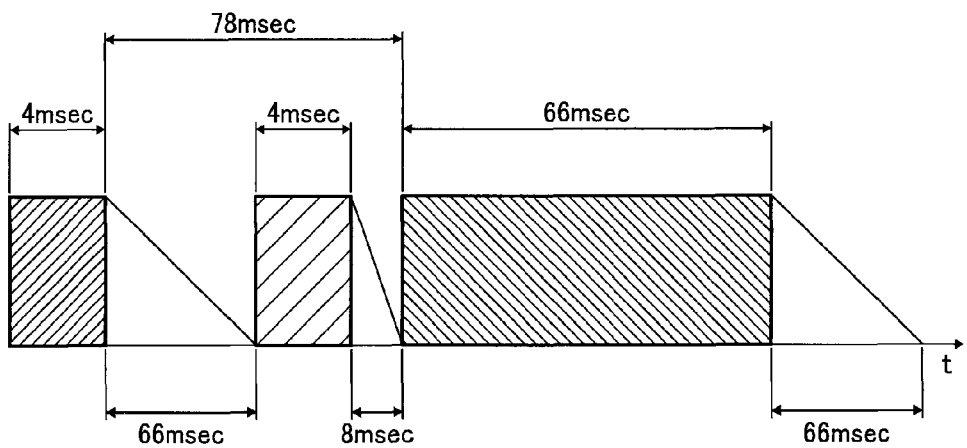
FIG. 6 is a view explaining exposure time and transfer time according to the first embodiment of the present invention.

In step 1, the mechanical shutter 2 is controlled and a first short time exposure imaging is performed. An exposure time of the first short time exposure imaging, for example, is 4 msec, as illustrated in FIG. 6, and image data of all pixels of the CCD 3 by the exposure is taken into the digital signal processing IC 32 as data of a first image, and is recorded in the frame memory 17. A transfer time of the image data of the first short time exposure imaging is about 66 msec. An image size of the whole pixels of the CCD 3 is 9 million pixels.

In step 2, after transferring of the image data of the whole pixels, the mechanical shutter 2 is controlled and a second short time exposure imaging is performed. An exposure time of the second short time imaging is about 4 msec as well, and thinning-out data of the CCD 3 by the exposure is taken into the digital signal processing IC 32 as data of a second image, and is recorded in the frame memory 17. An image size of the thinning-out image, for example, is 1 million pixels, and a transfer time thereof is about 8 msec.

In step 3, after transferring of the thinning-out image data, the mechanical shutter 2 is controlled and a long time exposure imaging is performed. An exposure time of the long time exposure is about 66 msec, and image data of the whole pixels of the CCD 3 by the exposure is taken into the digital signal processing IC 32 as data of a third image, and is recorded in the frame memory 17. A transfer time of the image data by the long time exposure imaging is about 66 msec.

In step 4, a displacement detection processing is performed to obtain a displacement amount, based on the data of the first image and the data of the third image. The control device 15 carries out an arithmetic processing to obtain the displacement amount.

The displacement detection processing is performed such that a comparison image, i.e., the first or the third image, for example, is divided into blocks of 32×32, i.e. the image plane is divided into 32 parts in a horizontal direction and 32 parts in a vertical direction. Next, a brightness value corresponding to each pixel is calculated. In each block, one image is moved at a direction of up, down, left and right one pixel by one pixel, and difference of brightness value with the other image is calculated. A movement amount when an average value of the differences in a block is the minimum value is decided as the displacement amount in the block. Since information of partial displacement is buried sometimes when the above-mentioned processing is performed on the whole image plane, the image is divided into blocks of 32×32 when performing the processing.

When the displacement amount is zero or small, no displacement or less displacement is determined.

In this embodiment, it is necessary to consider a difference of exposure time between the comparison images; therefore, the image of the short time exposure imaging is multiplied with a gain corresponding to the exposure time preliminarily, before computing the difference.

In addition, the displacement is required for judging whether the thinning-out short time exposure image and the long time exposure image are capable of being synthesized or not, and the thinning-out image has one-third of the size with respect to the long time exposure image in a horizontal and a vertical direction respectively; therefore a displacement amount within 3 pixels can be treated as having no displacement.

In step 5, whether the displacement amount obtained in step 4 is within a permissible range or not is determined, and when the displacement amount is determined to be within the permissible range, the process goes to step 6. The control device 15 determines whether the displacement amount is within the permissible range or not.

In step 6, the data of the first image and the data of the third image are synthesized. Because data of the first and the third image is the image data of the whole pixels, a synthetic image with high resolution and a wide dynamic range can be generated.

If "no" is determined in step 5, i.e. the displacement amount is out of the permissible range, then the process goes to step 7. Due to the hand shake correction being performed by the hand shake compensation device 301 for the displacement amount obtained in step 4, no displacement by hand shaking is generated; therefore it is possible that the displacement amount outside of the permissible range is only generated by a movement of the subject in the photographing region.

In step 7, the data of the second image and the data of the third image are synthesized. The data of the second image is thinning-out image data, and the transfer time of the data of the second image is short. Therefore a difference of the exposure time between the second and the third image is adequately short, and the displacement between the data of the second image and the data of the third image is less, and thus a synthetic image with a wide dynamic range in which an effect of the displacement is reduced to the minimum can be obtained. In addition, due to only the data of the second and the third image being synthesized, the synthesis processing time is short.

When synthesizing the data of the second image and the data of the third image, because of a small size of the second image, it is necessary to compensate the data of the second image and accommodate it to a size of the third image. The compensation processing can be performed by a well-known method such as a bi-linear interpolation or a bi-cubic convolution.

A synthetic image generated in steps 6, 7 is displayed on the LCD display 18, or is recorded in the frame memory 17, or is stored in the memory card 22, etc. The synthesis processing of steps 6, 7 is performed by the control device 15.

The processing from step 1 to step 7 is performed each time the shutter release button 201 is pressed one time.

As above-mentioned, since the first image is obtained by performing the first short time exposure imaging and the image data of the whole pixels is transferred, the second image is obtained by performing the second short time exposure imaging and the thinning-out image data is transferred, the third image is obtained by performing the long time exposure imaging and the image data of the whole pixels is transferred, and the displacement is obtained from the data of the first and the third image, and the synthesis of the data of the first and the third image or the data of the second and the third image is performed only, based on the displacement, it is not necessary to provide a special hardware which for example has multi-transfer paths of images to reduce a transfer time of image data; therefore, a general-purpose interface can be used, and an imaging apparatus with low cost can be provided.

In other words, when a still subject is imaged, obtaining an image with higher resolution is preferred and the data of the first and the third image is synthesized. When a moving subject is imaged, suppressing displacement is preferred and the data of the second and the third image is synthesized; therefore a synthetic image with a wide dynamic range suitable for the condition of the subject can be generated.

Second Embodiment

Figure 7:
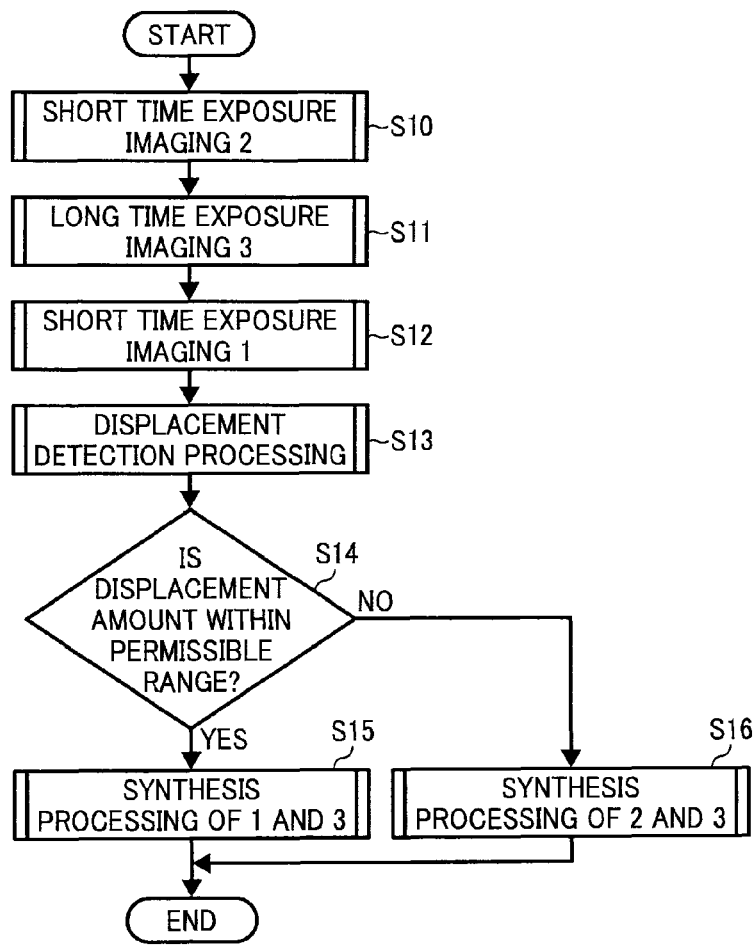
FIG. 7 is a flow chart illustrating a processing operation of a digital still camera according to a second embodiment of the present invention.

FIG. 7 is a flow chart illustrating a processing operation of the second embodiment. Operations of the second embodiment will be explained with reference to the flow chart.

Figure 8:
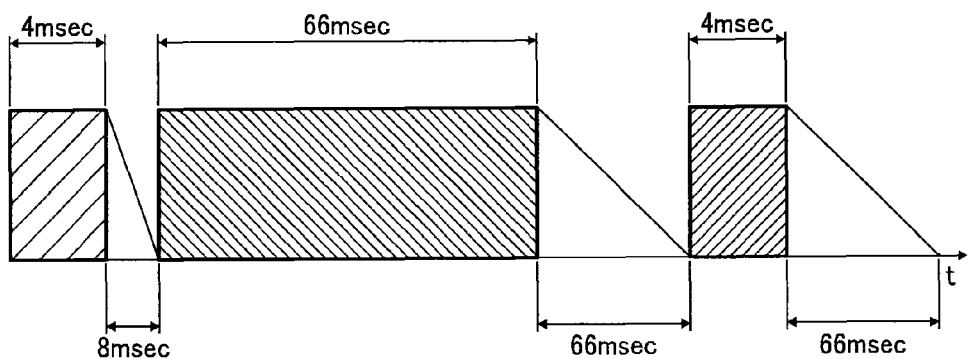
FIG. 8 is a view explaining exposure time and transfer time according to the second embodiment of the present invention.

In step 10, the mechanical shutter 2 is controlled and a first short time exposure imaging is performed. An exposure time of the first short time exposure imaging, for example, is 4 msec, as illustrated in FIG. 8, and thinning-out data of the CCD 3 by a first exposure is taken into the digital signal processing IC 32 as data of a first image, and is recorded in the frame memory 17. A transfer time of the image data is 8 msec.

In step 11, after transferring of the thinning-out image data, the mechanical shutter 2 is controlled and a long time exposure imaging is performed. An exposure time of the long time exposure imaging is about 66 msec, and image data of the whole pixels of the CCD 3 by a second exposure is taken into the digital signal processing IC 32 as data of a second image, and is recorded in the frame memory 17. A transfer time of the image data by the long time exposure imaging is about 66 msec.

In step 12, after transferring of the image data of the whole pixels, the mechanical shutter 2 is controlled and a second short time exposure imaging is performed. An exposure time of the second short time exposure imaging, is about 4 msec, and image data of the whole pixels of the CCD 3 by a third exposure is taken into the digital signal processing IC 32 as data of a third image, and is recorded in the frame memory 17. A transfer time of the image data of the second short time exposure imaging is about 66 msec. An image size of the whole pixels of the CCD 3 is 9 million pixels.

In step 13, a displacement detection processing is performed to obtain a displacement amount based on the data of the second image and the data of the third image. The control device 15 carries out an arithmetic processing to obtain the displacement amount. The displacement detection processing is similar to that performed in the first embodiment; therefore a detailed explanation is omitted here.

In step 14, whether the displacement amount obtained in step 13 is within a permissible range or not is determined, and when the displacement amount is determined to be within the permissible range, the process goes to step 15.

In step 15, the data of the second image (by the second exposure) which is obtained in step 11, and the data of the third image (by the third exposure) which is obtained in step 12 are synthesized. Because the data of the second and the third image is the image data of the whole pixels, a synthetic image with high resolution and a wide dynamic range can be generated.

If "no" is determined in step 14, i.e. the displacement amount is out of the permissible range, then the process goes to step 16.

In step 16, the data of the first image (by the first exposure) which is obtained in step 10, and the data of the second image (by the second exposure) which is obtained in step 11 are synthesized. The data of the first image is thinning-out image data, and the transfer time of the data of the first image is short. Therefore a difference of the exposure time between the first and the second image is adequately short, and the displacement between the data of the first image and the data of the second image is less, and thus a synthetic image with a wide dynamic range in which an effect of the displacement is reduced to the minimum can be obtained.

A synthetic image generated in steps 15, 16 is displayed on the LCD display 18, or is recorded in the frame memory 17, or is stored in the memory card 22, etc.

The second embodiment has a similar effect to the first embodiment.

Other Embodiment

Both in the first and the second embodiment, the CCD 3 is used as an image pickup device, but it is not limited to this, a CMOS sensor can be used as well. When the CMOS sensor is used, a rolling shutter method which performs exposure and transfer at the same time and a mechanical shutter method are employed.

For example, each of the exposures in steps 1 and 3 illustrated in FIG. 5 is performed by the mechanical shutter 2, and the exposure in step 2 is performed by the rolling shutter.

Thus, a time difference between the exposure time of the second image and the exposure time of the third image is nearly zero, and each of the exposures of the first and the third image is performed by the mechanical shutter 2. When the displacement amount is in the permissible range (synthesis of the data of the first and the third image), there is no effect of inherent distortion of the image by the rolling shutters and when the displacement amount is out of the permissible range (synthesis of the data of the second and the third image), the time difference between the exposure time of the second image and the exposure time of the third image is nearly zero; therefore a synthetic image with high resolution in which the effect of the displacement has been reduced remarkably can be generated.

Similarly, when performing each of the exposures in steps 11 and 12 illustrated in FIG. 7 by the mechanical shutter 2, and performing the exposure in step 10 by the rolling shutter, a similar effect to the above-mentioned one can be obtained.

According to the present invention, when a plurality of image data is synthesized, an effect of displacement can be reduced remarkably, and processing time of the synthesis processing is short, and an image with a wide dynamic range can be obtained.

It should be noted that although the present invention has been described with respect to exemplary embodiments, the invention is not limited thereto. In view of the foregoing, it is intended that the present invention cover modifications and variations provided they fall within the scope of the following claims and their equivalents.

What is claimed is:

1. An imaging apparatus, comprising:
   an imaging optical system;
   an image pickup device; and a control device which is configured to control the image pickup device, wherein the control device is configured to preliminarily decide an exposure order of a relatively short time exposure in a prescribed image size; an exposure with almost the same exposure time as the relatively short time in a smaller image size than the prescribed image size, and a relatively long time exposure in the prescribed image size, to perform an imaging operation once by exposing the image pickup device by the decided exposure order.

2. An imaging apparatus according to claim 1, wherein after the exposure with almost the same exposure time as the relatively short time in the smaller image size, the relatively long time exposure in the prescribed image size is performed.

3. An imaging apparatus according to claim 2, further comprising:
a displacement detecting device, which is configured to detect a displacement of a same subject, based on long time exposure image data, a first short time exposure image data obtained by the relatively short time exposure in the prescribed image size, or a second short time exposure image data obtained by the exposure with almost the same exposure time as the relatively short time in the smaller image size; and
an image processing device, which is configured to perform an image processing on image data of the subject imaged by the image pickup device,
wherein when a displacement amount detected by the displacement detecting device is equal to or less than a prescribed amount, the long time exposure image data and the first short time exposure image data are synthesized, and when the displacement amount is greater than the prescribed amount, the long time exposure image data and the second short time exposure image data are synthesized, to form one subject image.

4. An imaging apparatus according to claim 1, wherein the exposure order is the relatively short time exposure in the prescribed image size, the exposure with almost the same exposure time as the relatively short time in the smaller image size, and the relatively long time exposure in the prescribed image size.

5. An imaging apparatus according to claim 4, further comprising:
a displacement detecting device, which is configured to detect a displacement of a same subject, based on long time exposure image data, a first short time exposure image data obtained by the relatively short time exposure in the prescribed image size, or a second short time exposure image data obtained by the exposure with almost the same exposure time as the relatively short time in the smaller image size; and
an image processing device, which is configured to perform an image processing on image data of the subject imaged by the image pickup device,
wherein when a displacement amount detected by the displacement detecting device is equal to or less than a prescribed amount, the long time exposure image data and the first short time exposure image data are synthesized, and when the displacement amount is greater than the prescribed amount, the long time exposure image data and the second short time exposure image data are synthesized, to form one subject image.

6. An imaging apparatus according to claim 1, wherein the exposure order is the exposure with almost the same exposure time as the relatively short time in the smaller image size, the relatively long time exposure in the prescribed image size, and the relatively short time exposure in the prescribed image size.

7. An imaging apparatus according to claim 6, further comprising:
a displacement detecting device, which is configured to detect a displacement of a same subject, based on long time exposure image data, a first short time exposure image data obtained by the relatively short time exposure in the prescribed image size, or a second short time exposure image data obtained by the exposure with almost the same exposure time as the relatively short time in the smaller image size; and
an image processing device, which is configured to perform an image processing on image data of the subject imaged by the image pickup device,
wherein when a displacement amount detected by the displacement detecting device is equal to or less than a prescribed amount, the long time exposure image data and the first short time exposure image data are synthesized, and when the displacement amount is greater than the prescribed amount, the long time exposure image data and the second short time exposure image data are synthesized, to form one subject image.

8. An imaging apparatus according to claim 1, further comprising:
a displacement detecting device, which is configured to detect a displacement of a same subject, based on long time exposure image data, a first short time exposure image data obtained by the relatively short time exposure in the prescribed image size, or a second short time exposure image data obtained by the exposure with almost the same exposure time as the relatively short time in the smaller image size; and
an image processing device, which is configured to perform an image processing on image data of the subject imaged by the image pickup device,
wherein when a displacement amount detected by the displacement detecting device is equal to or less than a prescribed amount, the long time exposure image data and the first short time exposure image data are synthesized, and when the displacement amount is greater than the prescribed amount, the long time exposure image data and the second short time exposure image data are synthesized, to form one subject image.

9. An imaging apparatus according to claim 1, wherein the image pickup device is a CMOS sensor, and the imaging apparatus further comprises a mechanical shutter which is configured to control a light-receiving amount of the CMOS sensor,
wherein a global shutter method is performed by the mechanical shutter, in which the relatively short time exposure in the prescribed image size, the relatively long time exposure and an exposure of whole pixels are performed at a same timing,
and the relatively short time exposure in the smaller image size is performed with a rolling shutter method.

10. An imaging apparatus, comprising:
a main body which includes an imaging optical system and an image pickup device;
a shake detecting device which is configured to detect shake applied to the main body;
a hand shake compensation device which is configured to move the image pickup device and perform a hand shake compensation based on the shake detected by the shake detecting device;

a storing device which is configured to store image data of a subject imaged by the image pickup device;

an image processing device which is configured to perform an image processing on the image data stored in the storing device; and a control device which is configured to control the image pickup device and the image processing device, wherein the control device preliminarily decides an exposure order of a relatively short time exposure in a prescribed image size; an exposure with almost the same exposure time as the relatively short exposure time in a smaller image size than the prescribed image size, and a relatively long time exposure in the prescribed image size, and performs an imaging operation once by exposing the image pickup device in the decided exposure order, the storing device stores the three kinds exposure image data individually, the control device selects long time exposure image data obtained by the relatively long time exposure, and either one kind of the two kinds of image data obtained by the relatively short time exposure, based on the image data stored in the storing device, the image processing device synthesizes the long time exposure image data and the selected one kind of image data, to form one subject image.

* * * * *